Jan. 23, 1923.

G. G. HINSDALE.
RESILIENT WHEEL.
FILED DEC. 26, 1914.

Jan. 23, 1923.  
G. G. HINSDALE.  
RESILIENT WHEEL.  
FILED DEC. 26, 1914.  
1,442,805  
2 SHEETS-SHEET 2

WITNESSES:  
Cornelius P. Keane.  
Wesley E. Duncanson

INVENTOR.  
George G. Hinsdale  
BY Henry Chadbourn  
ATTORNEY.

Patented Jan. 23, 1923.

1,442,805

UNITED STATES PATENT OFFICE.

GEORGE G. HINSDALE, OF SOMERVILLE, MASSACHUSETTS, ASSIGNOR, BY DIRECT AND MESNE ASSIGNMENTS, TO AUTOCRAFT CORPORATION, OF BOSTON, MASSACHUSETTS, A CORPORATION OF MASSACHUSETTS.

RESILIENT WHEEL.

Application filed December 26, 1914. Serial No. 379,071.

*To all whom it may concern:*

Be it known that I, GEORGE G. HINSDALE, of Somerville, in the county of Middlesex and State of Massachusetts, have invented certain new and useful Improvements in Resilient Wheels, of which the following is a specification.

The present invention relates to improvements in resilient wheels, intended generally for use on motor-propelled vehicles, and consists essentially of a combination of parts whereby I can exactly balance or sustain the load carried thereby up to any required load without any deflection or settlement of the hub below the center of the structure while the wheel is at rest or rolling over a perfectly smooth surface; but which combination of parts at the same time enables me to make the structure so sensitive to impact that the wheel readily absorbs the vibrations and shocks generated in rolling over a rough surface, and whereby the same resiliency can be obtained whether applied to the lightest runabout or to the heaviest motor-driven fire apparatus or truck.

Heretofore resilient wheels have been constructed consisting of an inner rim and an outer rim of larger diameter leaving an annular chamber between such rims, said rims being connected by a series of yielding devices, one end of each device being connected to the inner rim and the opposite end to the outer rim. My invention consists essentially in forming each yielding device of the series of yielding devices as a unit, and in such a manner that the yielding medium of each unit is locked and held under the necessary initial stress to produce the desired result independent of its connections to the rims and prior to its insertion in the wheel. This I accomplish by engaging the yielding medium at both ends by each of the devices by which it is connected to the inner and to the outer rim. The initial stress on the yielding medium in each unit is determined by the number of units in each wheel and the normal load to be carried thereby, thus balancing the load on the wheel and allowing no deflection or eccentric displacement of the rims in the normal condition of the wheel or when moving on a perfectly smooth surface.

It is evident that any yielding medium may be so designed that it will support a given load when stressed to a certain definite length, which in my case is the distance fixed between the locks on the devices whereby the units are connected to the rims and which engage the yielding mediums at both ends; also, yielding mediums may be designed that in order to carry a given load at a given height they would have to be stressed different amounts in order to obtain the desired initial load capacity, and thereby I am able to produce yielding units of greater or lesser degrees of resiliency.

Thus the resiliency of my wheel, or its capacity for absorbing the vibrations generated in rolling over a rough surface, is entirely independent of the normal wheel load. From which it follows that two or more vehicles otherwise identical in weight and other details can be adapted to entirely different operating conditions, or two or more vehicles entirely different in weight and other details can be given the same freedom from vibration under the same operating conditions by my method of utilizing these independent properties of the yielding medium used in my invention.

The invention is carried out substantially as described hereinafter and shown on the accompanying drawings which form an essential part of this specification, and on which like characters of reference refer to like parts wherever they occur on the different parts of the drawings.

On the drawings:

Fig. 1 represents a sectional side elevation of a portion of a resilient wheel showing the various parts thereof under normal load.

Fig. 1ª is a similar view of the opposite side of the wheel showing the same under abnormal load.

Fig. 2 illustrates another method of arranging and constructing the yielding units.

Fig. 2ª shows the opposite side of the wheel of Fig. 2 under abnormal load.

Fig. 3 represents a plan view of one of the assembled units shown in Fig. 1, and when said unit is under normal load conditions.

Fig. 4 represents a side elevation of the same unit under normal load conditions.

Fig. 5 represents a similar view of the same unit at full compression under shock load.

Fig. 6 presents a similar view of the same unit at full extension under shock load.

Figures 2, 2A:
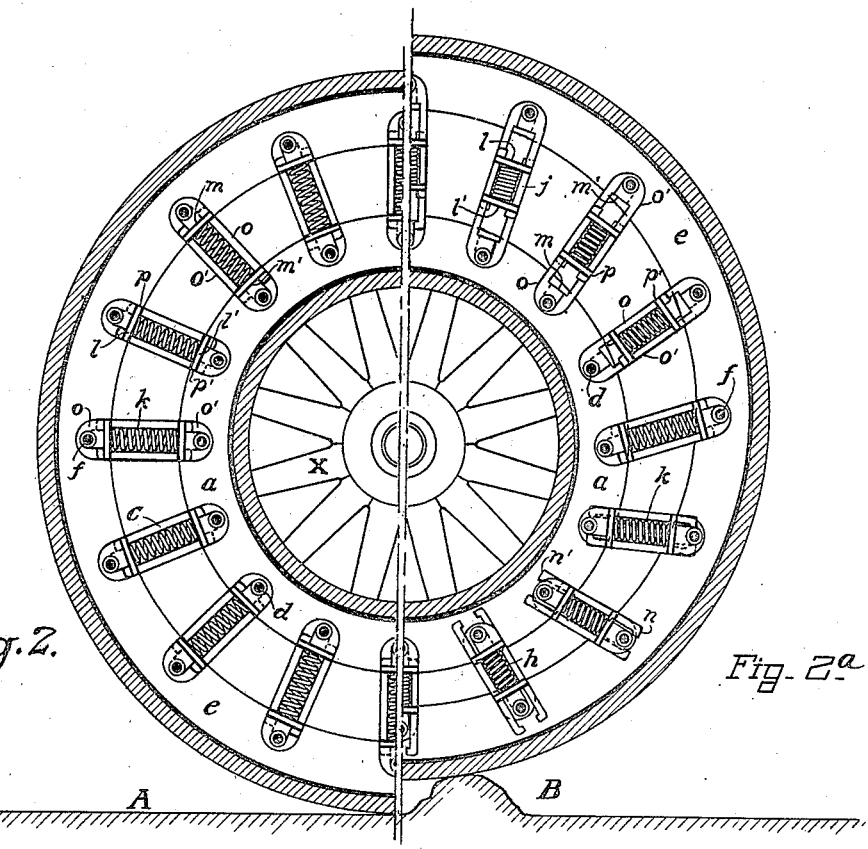
Figure 7:
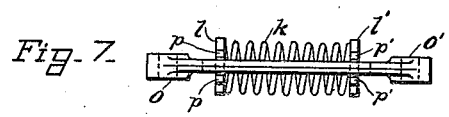

Fig. 7 represents a plan view of one of the assembled units shown in Fig. 2, and when said unit is under normal load conditions.

Figure 8:
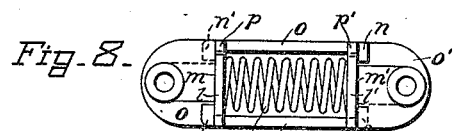

Fig. 8 represents a side elevation of the same unit under normal load conditions.

Figure 9:
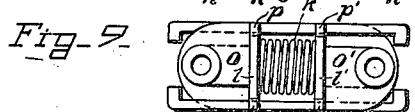

Fig. 9 represents a similar view of the same unit at full compression under shock load.

Figure 10:
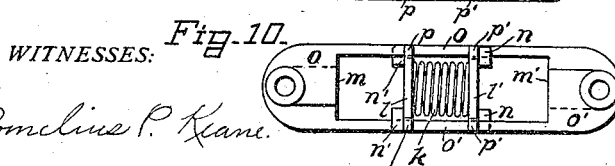

Fig. 10 represents a similar view of the same unit at full extension under shock load.

Figure 1:
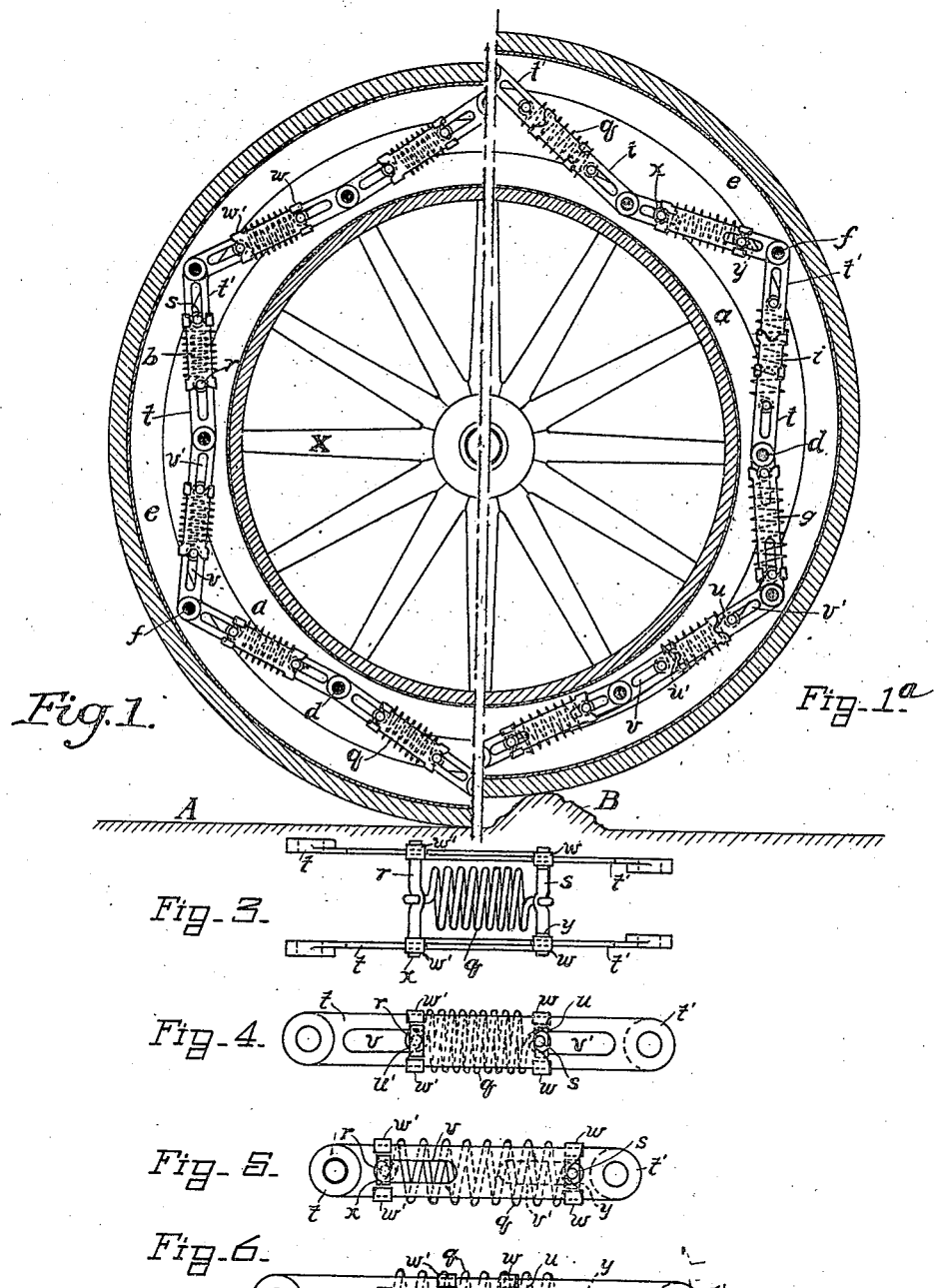

Referring to Figs. 1 and 2, A indicates the surface upon which the wheel is moving. The inner rim $a$ is rigidly attached to or forms a part of the wheel proper X, and to this rim are pivotally attached the inner ends of the series of units $b$ in Fig. 1 and $c$ in Fig. 2 by means of the bolts or pins $d$. The outer rim $e$ of larger diameter than the inner rim $a$ is also provided with a series of pivotal attachments as by means of the bolts or pins $f$ and by means of which the outer ends of the units $b$ and $c$ are connected to the said outer rim. The eccentric displacement of the rims $a$ and $e$ under shock loads will cause all of the yielding units to be relatively displaced as shown, and while some are shortened as shown at $g$ Fig. 1 and $h$ Fig. 2 others are lengthened as shown at $i$ and $j$ respectively in the same views. I have shown two arrangements of the yielding units, but it is understood that other arrangements and combinations are possible without departing from the essential features of my invention. Also, while any suitable yielding medium may be used I prefer to use the common helical spring.

Helical springs are made in two general types; close-coiled springs in which the stress under load should always act to open the coils, and open coiled springs in which the stress should always act to close the coils. I have shown two constructions of the yielding unit, one in which a spring of the close-coil type is used as the yielding medium and one in which a spring of the open-coil type is used. The construction of the first is clearly shown by Figs. 1, 3, 4, 5, and 6, and the latter by Figs. 2, 7, 8, 9, and 10.

In the unit construction shown in detail in Figs. 7, 8, 9 and 10 the open-coil spring $k$ is held under initial stress between two bearing plates $l$ and $l'$ mounted between the seats $m$ and $m'$ and the lugs $n$ and $n'$ of two parallel actuating members or arms $o$ and $o'$ respectively, the said actuating arms being so placed in relation to each other that the lugs $n$ and $n'$ on the free ends of each of the parallel arms and the seats $m$ and $m'$ of the other arms engage the outside of the respective plates $l$ and $l'$ holding the unit assembled in its normal load position as shown by Figs. 7 and 8 and under the desired initial stress. The plates $l$ and $l'$ are provided with the respective ears $p$ and $p'$ to hold the arms $o$ and $o'$ in alignment with each other. When the unit is shortened the seats $m$ and $m'$ on each of the parallel actuating arms move inwardly against the bearing plates $l$ and $l'$ and increase the stress on the spring $k$. When the unit is lengthened the parallel arms move apart causing the lugs $n$ and $n'$ on the arms to act inwardly against the plates $l$ and $l'$ and increase the stress on the spring.

In the other unit shown in detail in Figs. 3, 4, 5 and 6, the close-coil spring $q$ is supported at one end by the cross-bar $r$ and at the opposite end by the cross-bar $s$ and these bars are held spaced apart by the arms $t$ and $t'$ which are placed in pairs on either side of the spring. The arms have the respective notches $u$ and $u'$ at one end and the respective slotted perforations $v$ and $v'$ near the other end to receive the bars $r$ and $s$. The arms $t$ and $t'$ in each pair are so placed that the notch $u'$ or $u$ of one arm coincides with the inner end of the slotted perforation $v$ or $v'$ of the other arm when the unit is in its normal position. The ears $w$ and $w'$ on the arms $t$ and $t'$ act to hold the arms in alignment with each other longitudinally, while the lugs $x$ and $y$ on the cross bars $r$ and $s$ hold the pairs of arms suitably spaced apart laterally. When assembled and in the position shown by Figs. 3 and 4 the distance between the cross-bars $r$ and $s$ is such that the spring $q$ is held locked under the required initial stress to sustain the normal load to be supported by said spring without relative displacement of the two rims of the wheel. When the unit is shortened as shown in Fig. 5 the parallel arms in each pair slide longitudinally towards each other and their notched ends act outwardly against the cross-bars $r$ and $s$ causing them to move apart and thereby cause the placing of further stress on the spring $q$. When the unit is lengthened as shown in Fig. 6 the parallel arms are moved apart longitudinally and the inner ends of the slots $v$ and $v'$ act outwardly against the cross-bars causing them to move apart and thereby cause an increased stress on the spring. This shortening and lengthening of the units is caused by any relative displacement of the inner and outer rims of the wheel, which displacement is due to an increase of the load in excess of the normal load supported by the wheel or a sudden shock on the outer rim due to an obstacle B on the surface upon which the wheel is moving.

It will be observed that the application of load to the open-coil spring always acts to close the coils, and when applied to the close-coil spring it acts to open the coils, independent of whether the load causes the unit to be decreased or increased in length. While I have shown and described specific unit constructions, it is evident that any other suitable unit construction may be used without departing from the purpose of this invention so long as the yielding medium, or helical spring, is held assembled in the unit under initial stress.

It will be understood by the above description that by the introduction of the yielding units with their contained yielding mediums under any desired initial stress within the wheel, I am able to support any desired normal load without any displacement of the relative positions of the inner and the outer rims of the wheel to which such units are attached and between which they form the yielding connections. It will also be understood that the relative positions of the two rims of the wheel will remain the same when the wheel is supporting any load less than the normal load for which the yielding mediums in the units are stressed, and even when the load is entirely removed from the wheel or when the wheel is removed from the vehicle on which it is to be used.

Having thus fully described the nature, construction, and operation of my invention, what I claim as new and desire to secure by Letters Patent of the United States is:

1. A resilient wheel comprising a hub section, a rim section surrounding the hub section, and a series of unopposed spring units between said hub section and said rim section, held under a predetermined initial stress and pivoted at their ends to fixed points on said hub and rim sections respectively, the relative movement of the pivotal points of each spring unit either toward or away from each other increasing the stress of the spring, whereby any eccentric displacement of said sections relatively one to the other will increase the stress of all of the spring units irrespective of their position.

2. A resilient wheel for vehicles comprising a hub section to which the load is applied, a rim section surrounding the hub section and normally concentric therewith, and a series of unopposed spring units connecting said hub section, and said rim section, the relative movement of the points of connection of each spring unit either toward or away from each other increasing the stress of the spring, said spring units being each held independently under a normal initial stress such that the combined normal stress of all the spring units is at least equal to the normal load applied to the hub section, any eccentric displacement of said sections relatively one to the other under an excess load being adapted to exert increased stress on all of said spring units.

In testimony whereof I have affixed my signature, in presence of two witnesses.

GEORGE G. HINSDALE.

Witnesses:
A. CECIL EDWARDS,
M. GLADYS MUSGRAVE.